G. St. GEORGE, Jr.

STITCH-RIPPER.

No. 7,000.

Reissued March 14, 1876

Witnesses:

Lewis F. Brown,

A. P. Grant.

Inventor:

Geo. St. George, Jr.

by John A. Wiedersheim

Atty.

N. PETERS, PHOTO-LITHOGRAPHER, WASHINGTON, D. C.

UNITED STATES PATENT OFFICE.

GEORGE ST. GEORGE, JR., OF PHILADELPHIA, PENNSYLVANIA.

IMPROVEMENT IN STITCH-RIPPERS.

Specification forming part of Letters Patent No. 164,336, dated June 8, 1875; reissue No. 7,000, dated March 14, 1876; application filed February 16, 1876.

*To all whom it may concern:*

Be it known that I, GEORGE ST. GEORGE, Jr., of the city and county of Philadelphia and State of Pennsylvania, have invented a new and useful Improvement in Stitch-Rippers; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
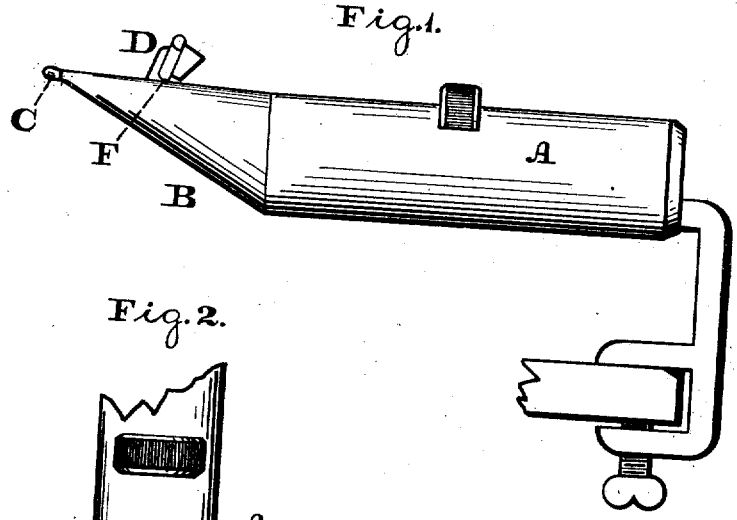
Figure 2:
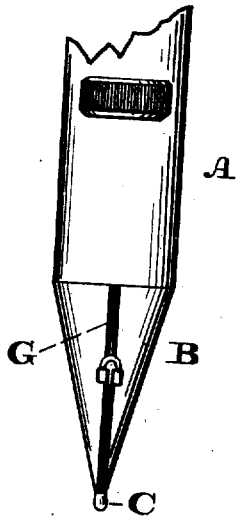
Figure 3:
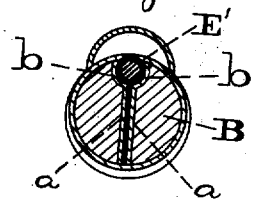
Figure 4:
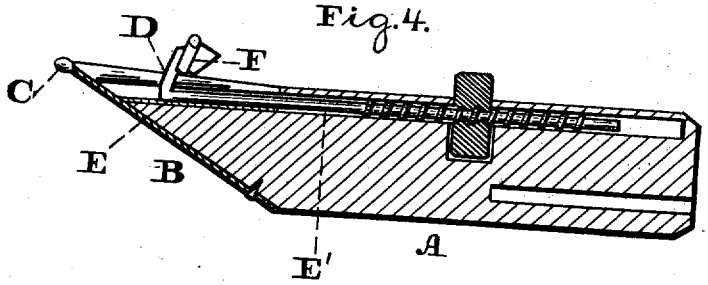

Figure 1 is a side view of the device. Fig. 2 is a plan view of a portion thereof. Fig. 3 is a transverse section. Fig. 4 is a longitudinal section.

Similar letters of reference indicate corresponding parts in the several figures.

My invention relates to a method of separating or ripping seams, sewed either by machine or hand. The invention consists of a knife-supporting stock, having an advancing point, which guides the work in advance of the distending or stretching operation. It also consists of a knife fixed to a holder, which is attached to a stock and supports the knife at an obtuse angle with reference to the stock. It also consists of a conical portion of the stock, so constructed that it will be stiffened and cannot be opened, and a channel is formed for the reception of the holder of the knife. It also consists in rendering the knife adjustable for various kinds of work. It also consists of a guard for preventing cutting of the fabric.

Referring to the drawings, A represents the stock of the ripping device, the forward portion B of which is of conical shape, and to the extreme front end of which there is fixed an advance point or guide, C. D represents a knife or blade, fixed to a holder, E, which is attached to the stock and has lips F, which project from the sides of the blade, and act as guards to prevent cutting of the fabrics. In closed seams or hems the point or guide C is inserted, and is thus in advance of the distension or stretching operation performed by the conical portion B, so that when the stitch reaches the knife the thread or stitch will be quickly and easily cut, the point C readily guiding the work and keeping the stock true thereto. G represents an opening in the length of the cone B. A piece of metal or other material is bent into shape, and the ends thereof continued inwardly toward the center of the cone, so as to form tongues *a a*, and said tongues are depressed laterally near the surface of the cone to form a channel, *b*. The stock A is pointed at one end, so as to correspond with the shape of the cone, and a slit is formed in said stock in the longitudinal direction thereof. The stem E′ of the holder E of the knife passes through the opening G, and is connected to a feed-bar which is fitted in the channel *b*, and has an adjustable sliding motion therein, and also plays in a slot or channel in the stock A, which latter carries the mechanism by which the adjusting motion of the bar and knife are imparted.

It will be seen that when the parts are in position the walls or sides of the slit of the stock embrace the tongues *a* and channel *b*, and they thus serve to stiffen the cone, prevent opening thereof, and strengthen channel *b*, which forms a way for the feed-bar. The knife may be readily moved nearer to or farther from the point of the cone, to meet the requirements of various parts of the work. In case of open seams, or two pieces of cloth sewed together, the knife is set back to the base of the cone; the cloth is then pulled backward and slightly downward.

Having thus described my invention, what I claim as new, and desire to secure by Letters Patent, is—

1. The knife-supporting stock, having an advance point or guide, *c*, substantially as and for the purpose set forth.

2. The knife D, fixed to the holder E, in combination with the stock A, supporting the said holders, substantially as and for the purpose set forth.

3. The conical portion B, formed with tongues *a a*, in combination with the slit-stock A, substantially as and for the purpose set forth.

4. A stitch-ripping knife, rendered adjustable relatively to the conical point of the supporting stock, for the purpose set forth.

5. The guard-lips F, in combination with the knife, substantially as and for the purpose set forth.

GEO. ST. GEORGE, JR.

Witnesses:
JOHN A. WIEDERSHEIM,
A. P. GRANT.